United States Patent
Harlow et al.

(10) Patent No.: US 11,158,204 B2
(45) Date of Patent: Oct. 26, 2021

(54) SYSTEM AND METHOD FOR CUSTOMIZING LEARNING INTERACTIONS BASED ON A USER MODEL

(71) Applicant: Cerego Japan Kabushiki Kaisha, Tokyo (JP)

(72) Inventors: Iain M. Harlow, Pleasant Hill, CA (US); Andrew Smith Lewis, Palo Alto, CA (US); Paul T. Mumma, Albany, CA (US)

(73) Assignee: CEREGO JAPAN KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 15/977,950

(22) Filed: May 11, 2018

(65) Prior Publication Data

US 2018/0357915 A1 Dec. 13, 2018

Related U.S. Application Data

(60) Provisional application No. 62/519,125, filed on Jun. 13, 2017.

(51) Int. Cl.
| | | |
|---|---|---|
| G09B 7/00 | (2006.01) | |
| G09B 7/06 | (2006.01) | |
| G06N 7/00 | (2006.01) | |
| G06F 17/18 | (2006.01) | |
| G06N 5/04 | (2006.01) | |
| G09B 7/04 | (2006.01) | |

(52) U.S. Cl.
CPC .............. *G09B 7/06* (2013.01); *G06F 17/18* (2013.01); *G06N 5/04* (2013.01); *G06N 7/00* (2013.01); *G06N 7/005* (2013.01); *G09B 7/04* (2013.01)

(58) Field of Classification Search
CPC .............. G09B 7/00; G09B 7/02; G09B 7/04
USPC ....... 434/322, 327, 335, 350, 351, 353, 354, 434/362
See application file for complete search history.

(56) References Cited

U.S. PATENT DOCUMENTS

| | | | |
|---|---|---|---|
| 4,870,579 A * | 9/1989 | Hey | G06Q 30/0202 705/7.31 |
| 6,652,283 B1 | 11/2003 | Van Schaack et al. | |
| 8,761,658 B2 * | 6/2014 | Kim | G09B 7/02 434/322 |
| 8,832,584 B1 | 9/2014 | Agarwal et al. | |
| 9,286,526 B1 | 3/2016 | Manohar | |
| 2005/0058978 A1 | 3/2005 | Benevento, II | |
| 2005/0138538 A1 | 6/2005 | Raguseo | |

(Continued)

OTHER PUBLICATIONS

Harlow et al., "System and Method for Customizing Learning Interactions Based on a User Model", U.S. Appl. No. 17/375,175, filed Jul. 14, 2021.

*Primary Examiner* — Kurt Fernstrom
(74) *Attorney, Agent, or Firm* — Keating and Bennett, LLP

(57) ABSTRACT

A method for predictively updating one or more user parameters associated with a user of a learning system includes predicting, based on the one or more user parameters, a predicted activity of the user, receiving an actual activity of the user, comparing the predicted activity to the actual activity, and updating the one or more user parameters in response to determining that the predicted activity does not match the actual activity. The method may further include scheduling one or more learning interactions based on the one or more updated learning parameters, where the scheduling includes selecting at least one of a timing of the one or more learning interactions or a type of the one or more learning interactions.

28 Claims, 5 Drawing Sheets

(56) References Cited

U.S. PATENT DOCUMENTS

| | | |
|---|---|---|
| 2006/0041538 A1 | 2/2006 | King et al. |
| 2006/0078868 A1* | 4/2006 | Douglas ............... G09B 7/00 434/365 |
| 2006/0105306 A1* | 5/2006 | Sisney ................. G09B 7/02 434/236 |
| 2006/0136821 A1 | 6/2006 | Barabe et al. |
| 2008/0166693 A1* | 7/2008 | Gifford ............... G09B 7/00 434/322 |
| 2010/0190143 A1 | 7/2010 | Gal et al. |
| 2011/0212430 A1* | 9/2011 | Smithmier ........... G09B 7/00 434/322 |
| 2012/0244507 A1* | 9/2012 | Tu ....................... G09B 7/00 434/362 |
| 2012/0329029 A1* | 12/2012 | Rauta .................. G09B 7/02 434/350 |
| 2014/0065592 A1* | 3/2014 | Strang ................. G09B 5/00 434/350 |
| 2014/0106318 A1* | 4/2014 | Wright ................ G09B 7/02 434/219 |
| 2014/0170626 A1* | 6/2014 | Lovett ................. G09B 5/00 434/350 |
| 2014/0205990 A1* | 7/2014 | Wellman ............. G09B 7/00 434/362 |
| 2015/0056596 A1* | 2/2015 | Bercovitz ............ G09B 7/02 434/350 |
| 2015/0064681 A1* | 3/2015 | Stahovich ........... G09B 5/00 434/350 |
| 2015/0269856 A1 | 9/2015 | Kelson |
| 2016/0063873 A1* | 3/2016 | Zimmer ............... G06Q 50/20 434/353 |
| 2016/0133148 A1 | 5/2016 | Hanks et al. |

\* cited by examiner

SYSTEM AND METHOD FOR CUSTOMIZING LEARNING INTERACTIONS BASED ON A USER MODEL

RELATED APPLICATIONS

This patent application claims priority to and benefit of the filing date of U.S. Provisional Patent Application No. 62/519,125, entitled "Personalized Learning Systems and Methods," filed Jun. 13, 2017, which is hereby incorporated by reference in its entirety.

TECHNICAL FIELD

Embodiments of the present disclosure relate generally to learning systems and more particularly to learning systems that provide customized learning interactions based on a user model.

BACKGROUND

Electronic learning technologies are commonly used to help students learn, develop skills, and enhance their understanding of certain subjects. For example, electronic learning technologies may provide a convenient way to take a course online. However, these technologies often provide the same curriculum for many or all the students in the course. For example, a given course may have a common starting point and a common ending point for the students, regardless of each student's weaknesses, strengths, and/or cognitive learning abilities.

Students typically vary in the way they learn, how quickly they learn, and how they retain what they learn. As a result, the general "one-size-fits-all" approach provided to the students is often ineffective, inefficient, and/or cumbersome to the students. Students using the "one-size-fits-all" approach may apportion too much time reviewing subject matter that they know well at the expense of spending insufficient time reviewing subject matter that they know poorly. In addition, many students may be burdened with trying to identify their own weaknesses and strengths for a given subject matter. Further, students may put forth efforts in determining how to apportion their time effectively to learn the subject matter. As a result, the students may struggle with such burdens, they may not perform well on exams, and they may become discouraged, leading to attrition—one of the most significant problems in education today.

DETAILED DESCRIPTION

Existing learning technologies have yet to overcome the technical challenge of modeling a user's learning attributes in a meaningful way, particularly in a way that enables the electronic learning technology to provide a customized learning experience to the user. For example, existing learning technologies may generate metrics that correspond to a low level, granular understanding of user capabilities. Examples of such metrics include discrete answer choices, test scores, and the like. These metrics may be inadequate for configuring a customized learning experience that truly captures and responds to the user's capabilities in an individualized manner. To illustrate, consider the fact that a human teacher is unlikely to summarize a student's progress by stating "this student answered 87.2% of questions correctly in an average time of 1.39 minutes per question" because this feedback says little about the student's underlying learning capabilities. Rather, a human teacher is more likely to summarize a student's progress with a statement such as "this student picks up new concepts extremely quickly, but seems to struggle when answering fill-in-the-blank type questions and is easily discouraged by bad grades." Similarly, the teacher may assign a numerical and/or letter grade to the student that summarizes the overall progress of the student. The grade may account for diverse factors such as test scores, attendance/timeliness, participation, improvement over time, and/or the like.

Existing electronic learning technologies generally do not generate metrics that offer a comparable summary of a user's learning capabilities. As a result, metrics provided by existing electronic learning technologies may have limited predictive power and/or may be unsuitable for use as configuration parameters to customize the technology to suit a particular user. For example, it would be desirable for an electronic learning technology to automatically customize the content that is presented to a user based on the user's capabilities. Similarly, it would be desirable for an electronic learning technology to automatically customize the selection of the timing and/or format in which content is delivered to the user. However, such customization is challenging and/or infeasible without configuration parameters that accurately and comprehensively reflect the user's current capabilities.

Accordingly, the development of improved techniques for modeling a user's learning capabilities may enable electronic learning technologies to present customized learning interactions to a user that include more relevant content, delivered at more suitable times, delivered in a more effective format, and/or the like.

Figure 1:
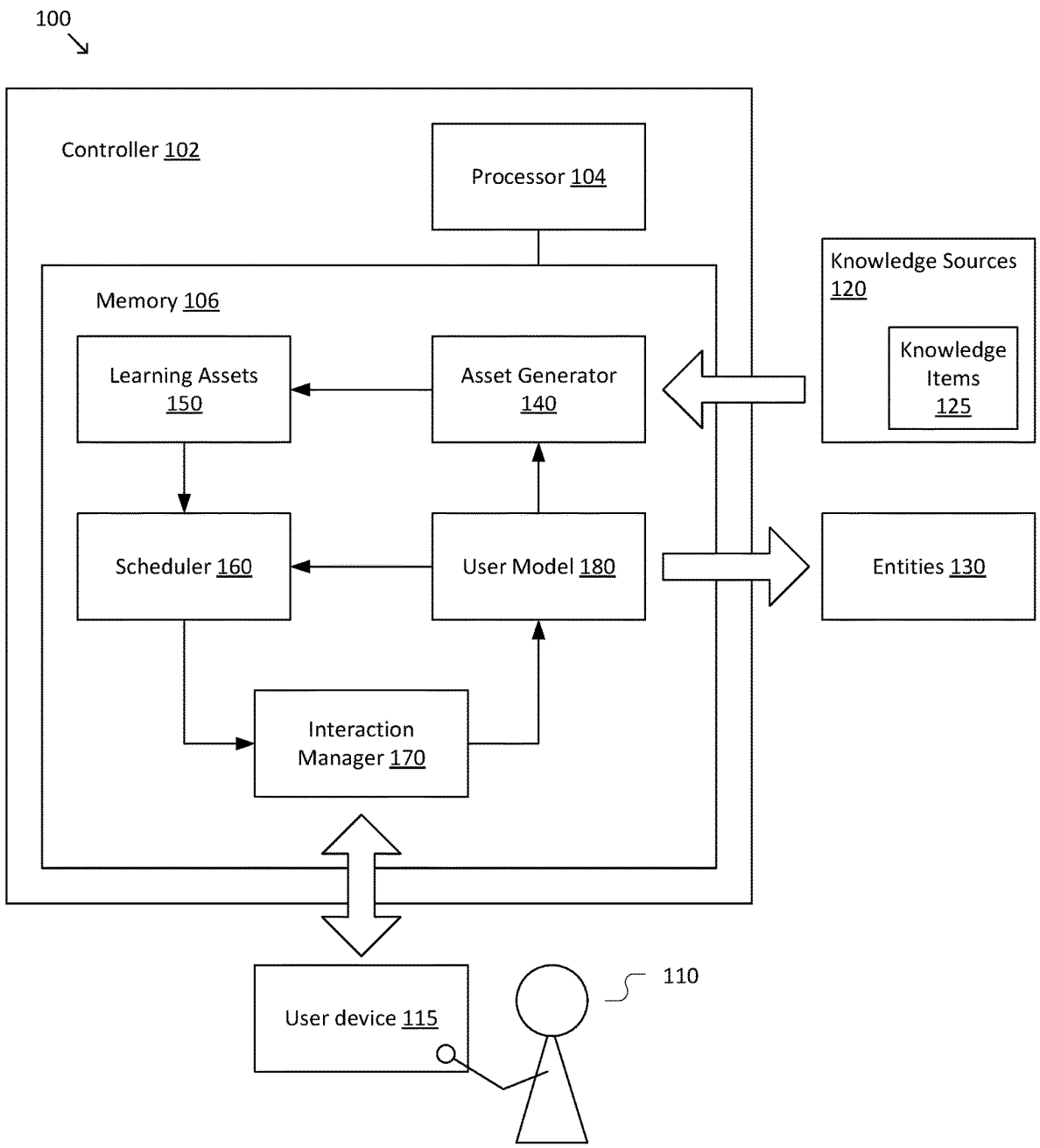
FIG. 1 is a simplified diagram of a learning system according to some embodiments.

FIG. 1 is a simplified diagram of a learning system 100 according to some embodiments. According to some embodiments, learning system 100 may be configured to facilitate knowledge acquisition by a user 110. In particular, learning system 100 may assist user 110 in acquiring knowledge from one or more knowledge sources 120 in furtherance of a learning objective. For example, the learning objective of user 110 may include a desire to learn about a topic, develop a skill, follow a procedure, learn a language, obtain a professional certification, satisfy continuing learning requirements, and/or the like. User 110 may be engaged in self-study and/or may be enrolled in a course along with other users of learning system 100, such as a school course (e.g., an elementary, high school, and/or college course), an institutional training course (e.g., a training course used by business, corporate, government, and/or military entities), and/or the like. In some embodiments, learning system 100 may include features similar to those described in U.S. patent application Ser. No. 15/836,631, entitled "Personalized Learning System and Method for the Automated Generation of Structured Learning Assets based on User Data," filed Dec. 8, 2017, which is hereby incorporated by reference in its entirety.

Illustrative examples of knowledge sources 120 may include textbooks, academic courses, lectures or seminars, encyclopedias, journal articles, instruction manuals, guidebooks, dictionaries, maps, recipes, and/or the like. Knowledge sources 120 may be represented in a variety of structured and/or unstructured digital formats, including but not limited to text, audio, and/or multimedia formats. In some embodiments, learning system 100 may store knowledge sources 120 locally and/or may access knowledge sources 120 remotely over a network (e.g., the Internet). In general, each of knowledge sources 120 includes one or more knowledge items 125, which correspond to a subset of learnable subject matter from knowledge sources 120 that is relevant to the learning objectives of user 110. For example, knowledge items 125 may include discrete concepts, facts, figures, graphs, images, multimedia content, processes, equations, formulas, and/or the like contained in knowledge sources 120.

To facilitate knowledge acquisition by user 110, learning system 100 may provide a series of learning interactions to user 110. The learning interactions may be intended to introduce user 110 to new knowledge items 125, to reinforce previously presented knowledge items 125, to assess the progress of user 110, to provide feedback to user 110, and/or the like. In some embodiments, sets of learning interactions may be grouped and/or arranged to form courses, modules, sub-modules, learning sessions (e.g., sets of learning interactions intended to be performed in a single sitting), and/or the like. In some embodiments, learning system 100 may schedule the learning interactions to achieve a desired outcome, such as long-term retention of knowledge items 125, peak short-term retention of knowledge items 125 (e.g., in preparation for a particular event or deadline, such as an exam or performance), and/or the like. In this regard, user 110 may be regarded as having a memory state that generally corresponds to the set of knowledge items 125 that user 110 knows at a point in time and how well user 110 knows the information (e.g., how quickly or precisely user 110 is able to recall the information, and for how long user 110 is likely to remember the information). In some embodiments, learning system 100 may measure the memory state of user 110 in order to customize the schedule of learning interactions to user 110.

User 110 may access learning system 100 via a user device 115. User device 115 may correspond to a local terminal of learning system 100 and/or a remote node for accessing learning system 100 via a network (e.g., the Internet). For example, user device 115 may include a mobile device, a personal computer, a digital assistant, an electronic reader, a wearable electronic device, an Internet-of-Things (IoT) device, an augmented and/or virtual reality (AR/VR) device, and/or the like. In addition to user 110, other entities 130 may access learning system 100 for a variety of purposes. For example, a teacher may access learning system 100 to monitor the progress of his or her students (e.g., user 110), an administrator of learning system 100 may access learning system 100 to monitor the performance of learning system 100, a content developer (e.g., a provider of knowledge sources 120) may access learning system 100 to evaluate the effectiveness of knowledge sources 120, a researcher may access learning system 100 to conduct academic studies based on data associated with learning system 100, and/or the like.

As depicted in FIG. 1, learning system 100 includes a controller 102 communicatively coupled to user device 115. In some embodiments, controller 102 may include a processor 104 (e.g., one or more hardware processors). Generally, processor 104 may include one or more general purpose central processing units (CPUs). Additionally or alternately, processor 104 may include at least one processor that provides accelerated performance when evaluating neural network models. For example, processor 104 may include a graphics processing unit (GPU), an application specific integrated circuit (ASIC), a field programmable gate array (FPGA), a tensor processing unit (TPU), a digital signal processor (DSP), a single-instruction multiple-data (SIMD) processor, and/or the like. Generally, such processors may accelerate various computing tasks associated with evaluating neural network models (e.g., training, prediction, preprocessing, and/or the like) by an order of magnitude or more in comparison to a general purpose CPU.

Controller 102 may further include a memory 106 (e.g., one or more non-transitory memories). Memory 106 may include various types of short-term and/or long-term storage modules including cache memory, static random access memory (SRAM), dynamic random access memory (DRAM), non-volatile memory (NVM), flash memory, solid state drives (SSD), hard disk drives (HDD), optical storage media, magnetic tape, and/or the like. In some embodiments, memory 106 may store instructions that are executable by processor 104 to cause processor 104 to perform operations corresponding to processes disclosed herein and described in more detail below.

Processor 104 and/or memory 106 may be arranged in any suitable physical arrangement. In some embodiments, processor 104 and/or memory 106 may be implemented on a same board, in a same package (e.g., system-in-package), on a same chip (e.g., system-on-chip), and/or the like. In some embodiments, processor 104 and/or memory 106 may include distributed, virtualized, and/or containerized computing resources. Consistent with such embodiments, processor 104 and/or memory 106 may be located in one or more data centers and/or cloud computing facilities.

In some embodiments, learning system 100 may include an asset generator module 140. As depicted in FIG. 1, asset generator module 140 extracts knowledge items 125 from knowledge sources 120 and generates learning assets 150 based on knowledge items 125. In general, learning assets 150 correspond to sets of knowledge items 125 selected based on a predetermined relationship. For example, a given learning asset 150 may include knowledge items 125 related to a particular topic or sub-topic. To illustrate, a learning asset 150 corresponding to a historical person may include a set of knowledge items 125 that identify the person's name, date of birth, historical significance, and/or the like. In some embodiments, learning assets 150 may be structured according to predefined templates that include a set of slots (e.g., name, date of birth, historical significance, etc.) with values that are populated using knowledge items 125. Illustrative examples of predefined templates may include association templates, vocabulary templates, passage templates, image and/or video region templates, sequence templates, and/or pattern templates, and/or the like. Examples of predefined templates are further described in U.S. patent application Ser. No. 15/836,631. In some embodiments, learning assets 150 may further include metadata that assists learning system 100 in using learning assets 150 effectively. For example, the metadata may include sequencing information, priority information, information identifying relationships among learning assets 150, and/or the like. It is to be understood that template-based learning assets as described above are merely illustrative, and that learning assets 150 may additionally or alternately correspond to various types of collections that facilitate storing and retrieving knowledge items 125 (e.g., databases, file systems, etc.).

Learning system 100 may further include a scheduler module 160 that schedules learning interactions between learning system 100 and user 110. In general, scheduler module 160 is configured to present learning interactions to user 110 in a manner that is conducive to efficiently achieving the learning objective of user 110. In this manner, the scheduling determinations made by scheduler module 160 may influence the rate at which user 110 progresses towards the learning objective. For example, scheduler module 160 may intelligently determine when to present a particular learning interaction to user 110, how often to reinforce concepts (e.g., by repetition and/or quizzing user 110), the presentation mode for the particular learning interaction (e.g., text-based presentation, multimedia-based presentation, question and answer session, flash cards, etc.), and/or the like. Similarly, scheduler module 160 may intelligently determine when to assess the performance of user 110, the type of assessment (e.g., multiple choice quiz, short answer essay, etc.), the topics to cover in a particular assessment, and/or the like. When presenting a set of learning interactions (e.g., a course, module, learning session, and/or the like), scheduler module 160 may intelligently determine the scope, content, and/or pacing of the course, the regularity and/or type of feedback user 110 receives, the content that is emphasized and/or de-emphasized in the course, and/or the like. In some embodiments, scheduler module 160 may make such scheduling determinations based on one or more statistical models, neural network models, rule-based models, and/or the like. Based on the scheduling determinations, learning system 100 may transmit notifications to user 110 (e.g., text message alerts, email messages, social media messages, and/or the like) to notify user 110 of particular times and/or ranges of time to access learning system 100 and/or to perform certain tasks, such as studying, practicing, training, and/or the like.

In some embodiments, scheduler module 160 may implement a scheduling algorithm that selects a schedule based on one or more optimization goals. For example, an optimization goal may include long-term retention of subject matter, in which case the scheduling algorithm may select a schedule that is likely to cause user 110 to remember knowledge items 125 for a predetermined and/or otherwise substantial period of time (e.g., months, years, permanently, etc.). Additionally or alternately, an optimization goal may include activating or refreshing subject matter for peak retention on a particular upcoming date, such as the date of an exam, competition, performance, and/or the like.

In some embodiments, scheduler module 160 may implement a plurality of scheduling algorithms, which select a corresponding plurality of schedules. The plurality of schedules may be merged to form a combined schedule or implemented separately to achieve different objectives (e.g., different optimization goals). In some embodiments, the respective objectives of the plurality of scheduling algorithms may be inconsistent with each other, in tension with one another, and/or otherwise different from one another. For example, a first scheduling algorithm may select a first schedule based on the optimization goals of user 110, such as long-term retention, activation of subject matter on a particular upcoming date, and/or the like. The first algorithm may prioritize one or more user-specific factors, such as the availability of user 110 at particular times of day, motivational effects (e.g., effects on the rate of progress of user 110), and/or the like. A second scheduling algorithm may select a second schedule based on the goal of measuring attributes of user 110, such as the current or future memory state of user 110, the learning capabilities of user 110, the difficulty and/or effectiveness of content provided by learning system 100, and/or the like. The second algorithm may prioritize adherence to scientific models and/or measurement accuracy (e.g., accurate prediction of current and future memory states of user 110). In these examples, combining multiple scheduling algorithms to address user-focused goals (e.g., retention) and system-focused goals (e.g., measurement) may be more effective than an attempt to achieve the various goals using a single scheduling algorithm. Additionally or alternatively, the first algorithm may be visible to user 110 and optimized to encourage optimal engagement with the material for learning, while the second algorithm may be invisible to user 110 but optimized to precisely track the development of memories and support accurate measurements.

In some embodiments, scheduler module 160 may determine a relatively wide range of times at which user 110 should access learning system 100 and/or perform certain tasks. For example, the scheduling algorithm used by scheduler module 160 may select a first range of times at which user 110 should study, such as a particular day, week, and/or the like. To provide more specific guidance to user 110, scheduler module 160 may select a second, narrower range of times within the first range (e.g., a particular day within a given week, a particular time and/or part of day within a given day, and/or the like) based on user preferences and/or by tracking the most effective learning times for user 110. For example, when the user preferences indicate that user 110 is a morning person, scheduler module 160 may be more likely to notify user 110 to study during mornings. On the other hand, when tracking data indicates that user 110 often misses study sessions scheduled during mornings (e.g., due to an irregular work schedule), scheduler module 160 may be more likely to notify user 110 to study during evenings and/or another time of day when user 110 is more consistently available. Similarly, historical measurements of accuracy or learning rates may inform the timing of notifications. For example, a notification may be sent at 9 p.m. based on historical user data indicating that user 110 learns more effectively at that time of day than at other times.

In some embodiments, scheduler module 160 may automatically generate an on-demand learning session in response to a request from user 110. For example, learning system 100 may present user 110 with an option to engage in a short learning session (e.g., via a "Smart Learn" button on a user interface of user device 115). When user selects the option (e.g., by clicking on the button), scheduler module 160 may generate a learning session based on factors such as the current progress and/or performance of user 110 in a particular course. For example, scheduler module 160 may prioritize learning interactions that maximize progress towards an assigned learning goal that is due soon, over learning interactions associated with a deadline that is later or already in the past.

In some embodiments, scheduler module 160 may include an intrasession scheduler that dynamically orders learning interactions in a given learning session. In some embodiments, the intrasession scheduler may implement a scheduling algorithm that optimizes the sequence of learning interactions based on the content of the learning interactions. For example, the intrasession scheduler may randomize and/or shuffle learning interactions during a review session to increase the level of difficulty and/or reduce predictability, place new and/or challenging learning interactions earlier in the learning session when the attentiveness of user 110 is likely to be highest, customize the order for user 110 based on working memory and memory strength associated with the learning interaction, and/or the like.

In some embodiments, scheduler module 160 may schedule remedial learning interactions based on one or more detected gaps in the knowledge of user 110. For example, when learning system 100 detects that user 110 has a tendency to conflate two or more concepts on a quiz, scheduler module 160 may schedule a remedial learning interaction that highlights differences between the two or more concepts that user 110 is mixing up.

Learning system 100 may further include an interaction manager module 170 that manages learning interactions between learning system 100 and user 110. For example, interaction manager module 170 may generate and transmit a learning interaction to user device 115. When the learning interaction is a responsive learning interaction (e.g., an interaction that includes a response from user 110, such as a quiz question), interaction manager module 170 may further receive and handle the response from user device 115. In general, user 110 may provide responses in any suitable manner, such as via a user interface (e.g., mouse, keyboard, joystick, touchpad, and/or touchscreen inputs), verbal responses (e.g., spoken commands), physical responses (e.g., gestures), and/or the like.

Learning system 100 may further include a user model 180 associated with user 110. User model 180 may include a set of user parameters associated with user 110. The set of user parameters may be used to evaluate the past performance of user 110, determine the current capabilities of user 110, predict the future performance of user 110, and/or the like. In some embodiments, user model 180 may be used to customize learning system 100 based on the capabilities of user 110. For example, as further discussed below with respect to FIG. 3, asset generator module 140 may generate a customized set of learning assets 150 based on user model 180 and/or the set of user parameters therein. Similarly, scheduler module 160 may generate a customized schedule of learning interactions based on user model 180 and/or the set of user parameters therein. Still further, user model 180 may be transmitted to user 110 and/or other entities 130 to monitor the progress of user 110, the effectiveness of learning system 100, and/or the like. Embodiments of user model 180 are discussed in further detail below with reference to FIG. 2.

Figure 2:
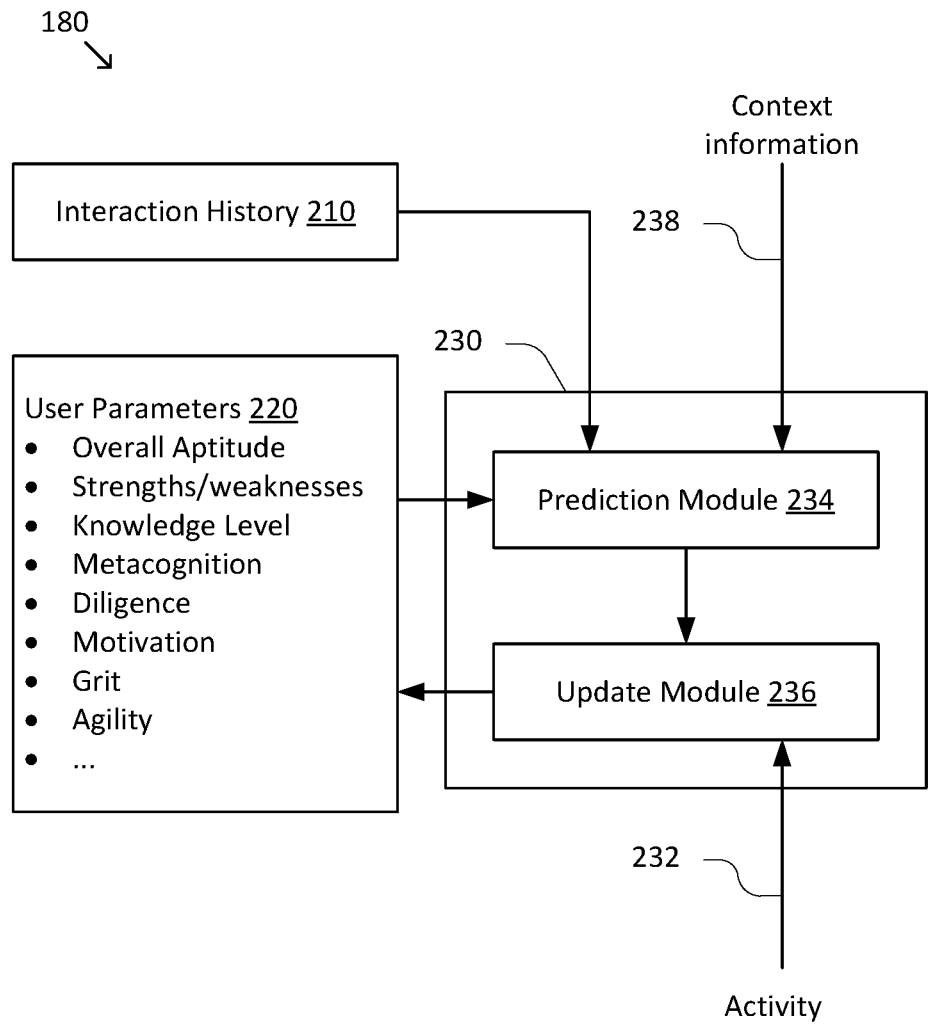
FIG. 2 is a simplified diagram of a user model according to some embodiments.

FIG. 2 is a simplified diagram of user model 180 according to some embodiments. As depicted in FIG. 2, user model 180 includes an interaction history 210. For example, interaction history 210 may include a log of interactions between learning system 100 and user 110. The logged interactions may include learning interactions and/or various other types of user interactions, such as login interactions, selection of user profile information and/or user preferences, site navigation interactions, and/or the like. In some embodiments, interaction history 210 may include the time and/or type of each interaction between learning system 100 and user 110. In the case of a responsive learning interaction, such as a quiz question, interaction history 210 may record the outcome of the interaction (e.g., whether user 110 selected the correct or incorrect answer), the amount of time user 110 took to respond, actions taken by user 110 while providing the response (e.g., requesting a hint), and/or the like. In some embodiments, interaction history 210 may include user-provided survey information associated with an interaction.

For example, learning system 100 may ask user 110 to rate a particular learning interaction in terms of difficulty, relevance, usefulness, clarity, and/or the like. In some embodiments, interaction history 210 may include metrics and/or aggregate data associated with user 110, such as average test scores, the level of progress in a course, and/or the like. In some embodiments, the metrics may include absolute metrics (e.g., the number of questions user 110 answered correctly), relative metrics (e.g., the percentile of user 110 relative to other users of learning system 100), and/or the like.

User model 180 may further include one or more user parameters 220. In some embodiments, user parameters 220 may reflect high-level and/or multi-factored assessments of the progress, performance, and/or potential of user 110. In comparison to interaction history 210, user parameters 220 may provide a more holistic snapshot of the progress, capabilities, and personality of user 110, thereby improving the customization and/or predictive capabilities of learning system 100. As depicted in FIG. 2, illustrative examples of user parameters 220 include measures of the capability of user 110, such as an overall aptitude of user 110, specific areas of strength and/or weakness (e.g., particular concepts and/or quiz types that user 110 excels at), the level of knowledge that user 110 has attained in a given subject domain, metacognition (e.g., the understanding user 110 has of his or her own thought processes), and/or the like. In some embodiments, user parameters 220 may be represented using numerical scores (e.g., a value between zero and one), tiers (e.g., "high," "medium," "low," etc.), ratings (e.g., letter grades), categories, percentiles, and/or the like.

In some embodiments, the user parameters 220 may include behavioral measures of user 110 that measure the personality of user 110 or how user 110 approaches tasks. Examples of behavioral measures may include diligence (the level of care user 110 applies to the learning process), motivation (e.g., whether user 110 is intrinsically motivated by the desire to learn, extrinsically motivated by the desire to achieve a passing grade, etc.), grit (e.g., the effort user 110 is willing to make to overcome challenges), agility (e.g., the ability of user 110 to learn and retain information with relative ease and/or difficulty), confidence, and/or the like. Learning system 100 may use such behavioral measures to determine the likelihood of success of user 110 in different contexts, receptiveness of user 110 to different types of notification or messaging, and/or suitability of user 110 for roles or tasks outside learning system 100. For example, a user with a high level of extrinsic motivation may be said to be motivated more by external than internal goals, and may accordingly be provided with more messaging around their progress towards external goals. In another example, a user may be identified as having higher than usual diligence, and may accordingly be considered for a task or role that requires high attention to detail or reliability.

To further illustrate how user parameters 220 may be used to customize and adapt learning system 100 to user 110, consider a scenario where user parameters 220 reflect that user 110 is extrinsically motivated to achieve good grades but is easily discouraged by bad grades. In this scenario, when user 110 is performing well, scheduler module 160 may schedule the delivery of progress updates to user 110 (e.g., progress towards and/or distance from completion of an assignment) at a high frequency to highlight that user 110 is on track toward the goal of a good grade. However, when user 110 is performing poorly, scheduler module 160 may shield user 110 from progress updates until user 110 is back on track. For example, scheduler module 160 may provide generic messages of encouragement instead of specific progress updates that would indicate that user 110 has fallen behind. On the other hand, in a scenario where user parameters 220 reflect that user 110 is intrinsically motivated, scheduler module 160 may provide feedback that is less focused on grades and/or course progress and more focused on providing user 110 with insight into his or her memory retention and/or learning preferences.

In another example, learning system 100 may provide one or more of user parameters 220, such as learning agility, diligence or other measures, to user 110 and/or external entities 130 as summary outcomes or reports for a given course. In some embodiments, the particular set of user parameters 220 may be customized based on empirical data. For example, the empirical data may reflect correlations between user parameters 220 and real-world outcomes such as job or task performance, promotions, examination success or similar measures. Accordingly, learning system 100 may adjust the course output to preferentially include a set of user parameters 220 that is empirically correlated with successful outcomes.

To maintain user parameters 220, user model 180 may include a predictive update module 230 that updates user parameters 220 based on an activity 232 of user 110. Activity 232 may take the form of (but is not limited to) a response by user 110 to a prompt provided by learning system 100, such as a responsive learning interaction, a survey, an assessment, a simulation, interactive multimedia, and/or the like. Additionally or alternately, activity 232 may include patterns of engagement with learning system 100 (which may or may not be prompted), such as login patterns, responses to notifications or lack thereof, the duration spent on various tasks or screens, and/or the like. In some embodiments, activity 232 may include activities independent of learning system 100, such as an externally administered exam, real-world jobs or tasks, and/or the like.

As depicted in FIG. 2, predictive update module 230 includes a prediction module 234 and an update module 236. Prediction module 234 predicts activity 232 based on one or more of interaction history 210 and user parameters 220. Prediction module 234 may also receive context information 238, such as the prompt provided to user 110 (e.g., a multiple-choice question) in a scenario where activity 232 is prompted. Prediction module 234 may predict the occurrence of activity 232 (e.g., whether user 110 will log in at a particular time) or may make predictions associated with the performance of activity 232 (e.g., how user 110 will score on a particular assessment). For example, when activity 232 corresponds to a response to a multiple choice quiz question, prediction module 234 may predict which answer choice user 110 will select and/or whether or not user 110 will select the correct answer choice. In another example, when activity 232 corresponds to an interaction with an instructional video, prediction module 234 may predict when, whether and/or for how long user 110 will view the video. In some embodiments, prediction module 234 may predict the performance of user 110 on a group of learning interactions, such as a predicted test score and/or a predicted course grade. In some embodiments, prediction module 234 may predict activity 232 using a statistical model, a neural network model, a rule-based model, and/or the like.

Update module 236 compares the activity predicted by prediction module 234 with the actual activity 232 of user 110. When the predicted and actual activities match, update module 236 may determine that user parameters 220 accurately reflect the progress and/or capabilities of user 110 and therefore may not adjust or update user parameters 220. When the predicted and actual activities do not match, update module 236 may adjust the values of one or more of user parameters 220. To illustrate, if prediction module 234 predicts that user 110 will select the wrong answer choice to a multiple-choice quiz question but user 110 actually selects the correct answer choice, update module 236 may determine that user parameters 220 underestimate the overall aptitude, diligence, etc. of user 110 and therefore may increase the values assigned to one or more of user parameters 220. Conversely, if prediction module 234 predicts that user 110 will select the correct answer choice but user 110 actually selects the wrong answer choice, update module 236 may determine that user parameters 220 overestimate the overall aptitude, diligence, etc. of user 110 and therefore may decrease the values assigned to one or more of user parameters 220. But if prediction module 234 predicts that user 110 will select the correct answer choice and user 110 does in fact select the correct answer choice (and/or vice versa), update module 236 may leave user parameters 220 unchanged.

In some embodiments, prediction module 234 may generate predictions for purposes other than comparison to actual activity 232. For example, prediction module 234 may predict aspects of the memory state of user 110 at a specific moment in the past, present or future, based on context information 238 provided by an outside party (e.g., one of entities 130) such as an instructor, examiner or employer. For example, the outside party may use prediction module 234 to predict the likely performance of user 110 on an examination of specific material on a specific date, and/or the readiness of user 110 for an event in the future. In another example, an outside party may use the prediction module 234 to predict a date in the future at which point the knowledge that user 110 has of a particular knowledge items 125 would have decayed below a specified threshold. For example, such prediction may be used to ensure adequate active knowledge of safety or compliance related material when user 110 is assigned to a critical task, such as may be encountered by pilots or medical professionals. In another embodiment, prediction module 234 may be used to predict the likelihood of reaching a goal by a particular date, such as the completion of a course module before a deadline, and/or to identify users who are more or less at risk of failing to reach such goals, with a view to intervening or assisting early enough to improve their final outcome.

Figure 3:
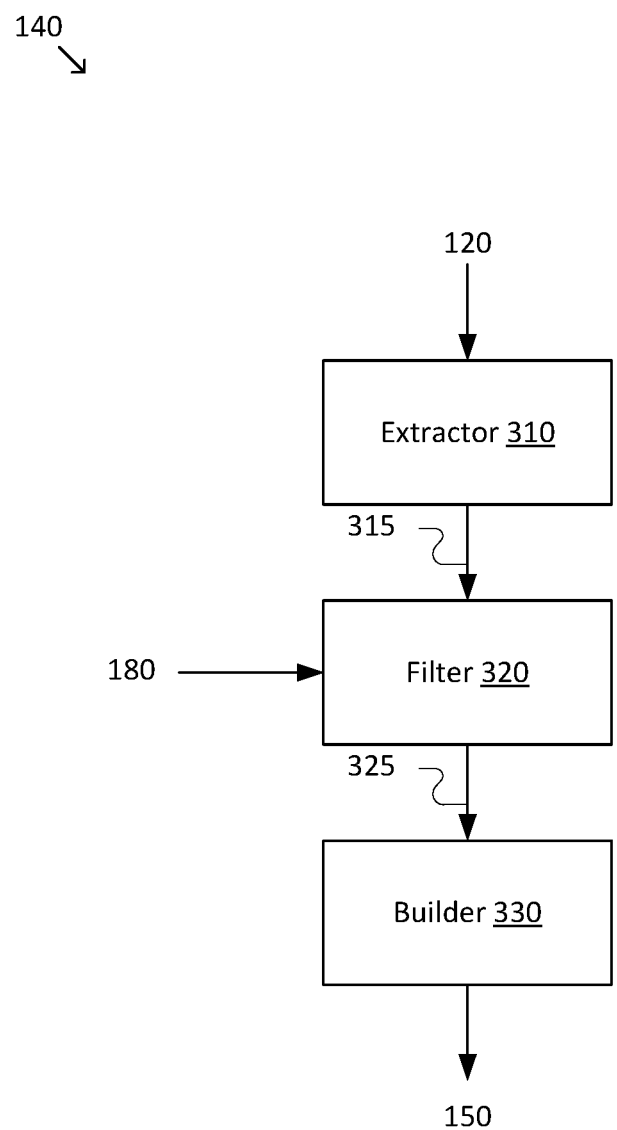
FIG. 3 is a simplified diagram of an asset generator module according to some embodiments.

FIG. 3 is a simplified diagram of asset generator module 140 according to some embodiments. Asset generator module 140 receives knowledge sources 120 and generates learning assets 150. In some embodiments consistent with FIGS. 1-2, the generation of learning assets 150 may be customized based on user model 180 and/or user parameters 220.

As depicted in FIG. 3, asset generator module 140 includes an extractor module 310 that receives knowledge sources 120 and extracts a set of knowledge items 315, which generally correspond to knowledge items 125. Asset generator module 140 may further include a filter module 320 that filters knowledge items 315 to provide a set of filtered knowledge items 325. In general, filter module 320 may filter knowledge items 315 based on a variety of filtering criteria. In some embodiments, one or more of the filtering criteria may be based on attributes that are intrinsic to knowledge items 315. For example, filter module 320 may remove duplicates and/or outliers from knowledge items 315 based on intrinsic attributes of knowledge items 315. In some embodiments, one or more of the filtering criteria may be based on externally provided parameters, such as user model 180 and/or user parameters 220. In this manner, filter module 320 may provide customized filtering tailored to the capabilities user 110. For example, when user parameters 220 indicate that user 110 has a high level of knowledge in a particular subject domain, filter module 320 may remove knowledge items 315 associated with introductory concepts in the subject domain while retaining knowledge items 315 associated with advanced concepts in the subject domain. Conversely, when user parameters 220 indicate that user 110 has a low level of knowledge in a particular subject domain, filter module 320 may remove knowledge items 315 associated with advanced concepts in the subject domain while retaining knowledge items 315 associated with introductory concepts in the subject domain.

In some embodiments, filter module 320 may filter knowledge items 315 based on a semantic model of knowledge sources 120, as further described in U.S. patent application Ser. No. 15/836,631. The semantic model identifies one or more topics and/or sub-topics covered by knowledge sources 120. In some examples, the semantic model may be generated using an unsupervised machine learning algorithm. Examples of unsupervised machine learning algorithms include explicit semantic analysis (ESA), latent semantic analysis (LSA), and/or the like. In some examples, the unsupervised machine learning algorithm may perform clustering based on the distribution of words in knowledge sources 120. Examples of clustering techniques include hierarchical cluster analysis, k-means clustering, Gaussian mixture model, and/or the like. For example, the unsupervised machine learning algorithm may include modeling the distribution of words in the tokenized text document as a mixture of categorical distributions, where each categorical distribution corresponds to a topic, and applying a Gaussian mixture model to the categorical distributions identify one or more topics in the tokenized text document. In this manner, a semantic model of the digital content is formed, where the semantic model may include an outline of the topics and/or sub-topics covered by the digital content, locations within the digital content that embody the topics and/or sub-topics, and/or the like. Based on the relationship between knowledge items 315 and the semantic model (e.g., whether knowledge items 315 relate to major topics identified in the semantic model), filter module 320 may assign values or scores to knowledge items 315 and select knowledge items 315 with the highest scores.

In some embodiments, filter module 320 may adjust the values assigned to knowledge items 315 based on empirical data, such as an empirical correlation between a user's level of knowledge in certain topics and real-world outcomes. To illustrate, consider a hypothetical empirical correlation between military squads being highly trained in tourniquet application and low casualty rates. Based on this empirical finding, filter module 320 may increase the values assigned to knowledge items 315 that are associated with tourniquet application.

Asset generator module 140 may further include a builder module 330 that builds learning assets 150 based on filtered knowledge items 325. In some examples, builder module 330 may build learning assets 150 by copying information associated with filtered knowledge items 325 into one or more predefined templates. For example, a predefined template may include a diagram slot and a caption slot. Accordingly, builder module 330 may insert a diagram selected from filtered knowledge items 325 into the diagram slot and a corresponding text caption for the diagram into the caption slot. In another example, builder module 330 may determine a relationship between filtered knowledge items 325, and/or a relationship between concepts within a given filtered knowledge item 325, to form a question and answer pair. To illustrate, if a given filtered knowledge item 325 includes the statement "Albert Einstein was born in Germany in 1879," the corresponding learning asset 150 may include a name slot with the value "Albert Einstein," a year-of-birth slot with the value "1879," and a place-of-birth slot with the value "Germany." In some embodiments, builder module 330 may add metadata to learning assets 150, such as the scores assigned to filtered knowledge items 325 by filter module 320.

Figure 4:
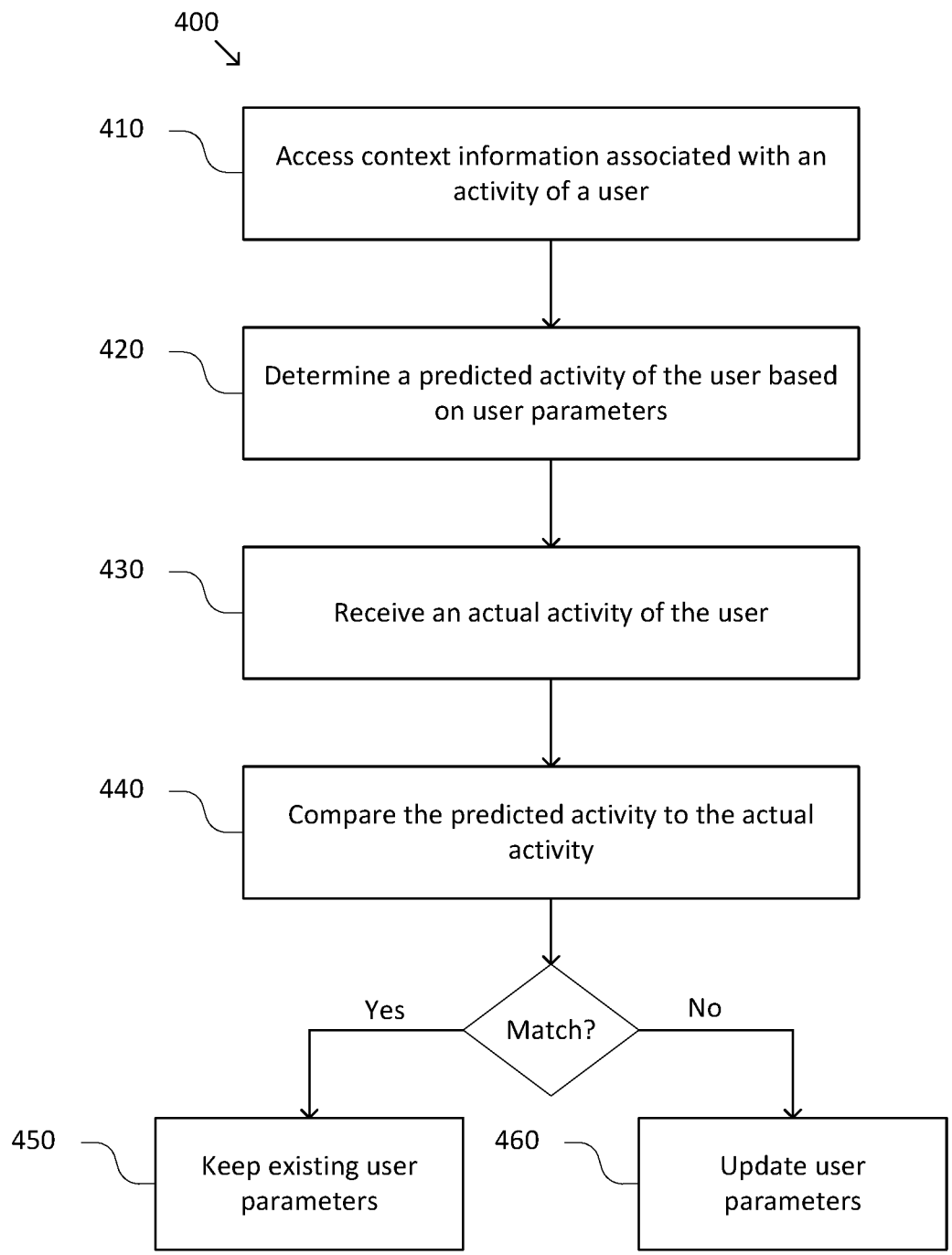
FIG. 4 is a simplified diagram of a method for predictively updating one or more user parameters associated with a user of a learning system according to some embodiments.

FIG. 4 is a simplified diagram of a method 400 for predictively updating one or more user parameters associated with a user of a learning system according to some embodiments. In some examples consistent with FIGS. 1-3, method 400 may be performed by processor 104 during execution of user model 180.

At a process 410, context information associated with an activity of a user, such as user 110, is accessed. In some embodiments, the context information may correspond to a prompt provided by the learning system to the user, such as a learning interaction, in a case where the activity of the user is prompted. For example, the learning interaction may correspond to a responsive learning interaction provided by interaction manager module 170 to which user 110 is expected to provide a response. In some embodiments, the learning interaction may include an assessment of the user's knowledge and/or abilities, such as a quiz question, an exercise, a trial run, and/or the like. It is to be appreciated that a wide variety of learning interactions are possible, the nature of which may generally depend on the particular learning objectives of user 110.

At a process 420, a predicted activity of the user is determined based on one or more user parameters, such as user parameters 220. In some embodiments, the predicted activity may further be determined based on an interaction history of user 110, such as interaction history 210. In some embodiments, the predicted activity may correspond to a predicted response of the user to a learning interaction (or other prompt). In some embodiments, determining the predicted activity may include predicting the occurrence of an activity (e.g., predicting when or for how long the user will log into the learning system) or making a prediction associated with the performance of the activity (e.g., how well the user will score on a quiz). Illustrative examples of predicted activities include a prediction of whether user 110 will select the correct answer to a multiple-choice question, whether user 110 will successfully complete a trial, and/or the like. In some embodiments, the predicted activity may be determined using a statistical model, a neural network model, a rule-based model, and/or the like.

At a process 430, an actual activity of the user is received. In some embodiments, the actual activity may correspond to a user-provided response to the learning interaction provided by user 110. For example, the user-provided response may correspond to the answer to a multiple-choice question selected by user 110. Other examples of actual activities may include patterns of engagement between the user and the learning system (e.g., logging in, browsing content, selecting courses, viewing and/or interacting with multimedia content, and/or the like), the selection of user preferences, activities that occur independently of the learning system (e.g., taking an exam or performing a task, the results of which may be received by the learning system), and/or the like.

At a process 440, the predicted activity is compared to the actual activity. When the predicted activity matches the actual activity, method 400 may proceed to a process 450 in which the existing user parameters are left unchanged. However, when the predicted activity does not match the actual activity, method 400 may proceed to a process 460 in which the user parameters are updated. In this manner, method 400 may provide an efficient technique for maintaining a set of user parameters that have significant predictive power and accurately reflect the capabilities of user 110.

Figure 5:
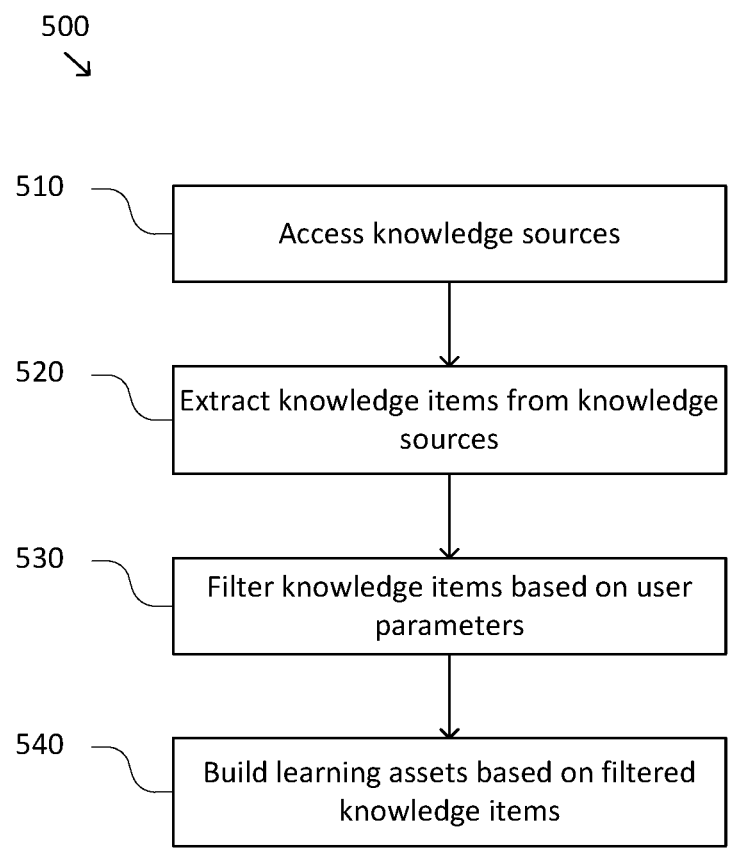
FIG. 5 is a simplified diagram of a method for generating customized learning assets according to some embodiments.

FIG. 5 is a simplified diagram of a method 500 for generating customized learning assets according to some embodiments. In some examples consistent with FIGS. 1-4, method 500 may be performed by processor 104 during execution of asset generator module 140.

At a process 510, one or more knowledge sources, such as knowledge sources 120, are accessed. In some examples, knowledge sources 120 may include one or more digital files, such as online textbooks, instruction videos, journal articles, and/or the like. In various embodiments, knowledge sources 120 may be unstructured and/or heterogeneous. For example, knowledge sources 120 may include raw text, HTML files, PDF files, multimedia content (e.g., JPEG, MPG, PNG, etc.), compressed files, and/or the like. In some examples, knowledge sources 120 may be received over a network (e.g., the Internet) and/or retrieved from local storage.

At a process 520, one or more knowledge items, such as knowledge items 125, are extracted from the one or more knowledge sources 120. For example, the one or more knowledge items 125 may be extracted by generating a text document based on knowledge sources 120 and applying natural language processing techniques to identify knowledge items 125 in the text document. Illustrative embodiments of extracting knowledge items using natural language processing techniques are further described in U.S. patent application Ser. No. 15/836,631.

At a process 530, the one or more knowledge items are filtered based on user parameters, such as user parameters 220. In some embodiments, the one or more knowledge items may be filtered by assigning a score to each of the knowledge items and selecting knowledge items with the highest scores. For example, the score may be assigned based on a relationship between a given knowledge item and a semantic model of the text document, as described above with reference to FIG. 3. In some embodiments, the score may be adjusted and/or weighted based on the user parameters. For example, when the user parameters indicate that user 110 has a high level of knowledge in a given topic, knowledge items related to a topic may be assigned lower scores than they otherwise would receive. Similarly, when the user parameters indicate that user 110 is intrinsically motivated by a desire to learn, knowledge items related to esoteric; topics (e.g., knowledge items that may be interesting but not particularly relevant to passing a particular exam) may be assigned higher scores than if user 110 is extrinsically motivated by a desire to pass a particular exam.

At a process 540, one or more learning assets, such as learning assets 150, are built based on the filtered knowledge items. In some examples, the learning assets may be built by copying information associated with the filtered knowledge items into one or more predefined templates, as discussed previously with respect to FIG. 3. In some embodiments, metadata, such as the scores assigned to the filtered knowledge items at process 530, may be included with the learning assets.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A method for predictively updating one or more user parameters associated with a user of a learning system, the method comprising:

predicting, based on the one or more user parameters, a predicted activity of the user corresponding to a predicted response to a first learning interaction provided to the user;

receiving an actual activity of the user corresponding to a user-provided response to the first learning interaction;

comparing the predicted activity to the actual activity;

in response to determining that the predicted activity does not match the actual activity, updating the one or more user parameters;

generating one or more learning assets based on the one or more updated user parameters, the one or more learning assets providing content for a second learning interaction;

generating the second learning interaction based on the one or more learning assets;

predicting, based on the one or more updated user parameters, whether or not each of a future knowledge of the user and an active knowledge of the user related to a particular task performed in a certain profession is below a specified threshold;

transmitting the one or more updated user parameters to an entity other than the user to provide feedback associated with the user; and transmitting the second learning interaction to the user in response to the future knowledge of the user and/or the active knowledge of the user related to the particular task performed in the certain profession being predicted to be below the specified threshold; wherein the generating of the one or more learning assets includes:
    accessing one or more knowledge sources;
    generating a text document based on a digital file included in the one or more knowledge sources accessed;
    tokenizing the text document;
    generating a semantic model based on the tokenized text document using an unsupervised machine learning algorithm;
    assigning a plurality of passage scores to a corresponding plurality of passages of the tokenized text document, wherein each of the plurality of passage scores is assigned based on a relationship between a respective one of the plurality of passages and the semantic model; and
    selecting a plurality of knowledge items from the tokenized text document based on the plurality of passage scores to extract the plurality of knowledge items from the one or more knowledge sources;
    filtering the plurality of knowledge items based on the one or more updated user parameters to form one or more filtered knowledge items; and
    building the one or more learning assets based on the one or more filtered knowledge items; and the predicted activity is further predicted based on an interaction history associated with the user, the interaction history includes previous user-provided responses to previous learning interactions.

2. The method of claim 1, wherein the one or more user parameters include at least one of an overall aptitude, an area of strength or weakness, a knowledge level, metacognition, diligence, motivation, grit, or agility.

3. The method of claim 1, wherein the predicted activity is further predicted based on the first learning interaction provided to the user, and wherein the method further comprises scheduling the second learning interaction based on the one or more updated user parameters.

4. The method of claim 3, wherein the scheduling of the second learning interaction comprises selecting at least one of a timing of the second learning interaction or a type of the second learning interaction.

5. The method of claim 1, wherein the interaction history includes aggregate statistics associated with the previous user-provided responses and other previous interactions between the user and the learning system.

6. The method of claim 1, wherein
the digital file included in the one or more knowledge sources accessed includes one or more of text, audio, and multimedia in an unstructured digital format; and
the generating the text document includes:
generating a plurality of intermediate text documents from the digital file using a corresponding plurality of conversion techniques;
selecting the text document from the plurality of intermediate text documents; and
repairing the text document in response to the selecting the text document from the plurality of intermediate text documents.

7. The method of claim 1, further comprising:
identifying a plurality of concepts in the tokenized text document;
assigning a concept score to each of the plurality of concepts based on a second relationship between each of the plurality of concepts and the semantic model; wherein
the plurality of passage scores are assigned based on the concept score corresponding to each of the plurality of concepts;
the plurality of concepts include noun phrases determined using natural language processing of the tokenized text document, and the natural language processing includes at least speech tagging or noun chunking; and
the second relationship is defined by a centrality metric that indicates how central a corresponding concept is to one or more topics in the semantic model.

8. The method of claim 1, further comprising:
generating an electronic copy of at least a portion of the digital file included in the one or more knowledge sources accessed, the electronic copy including a plurality of highlighted items that are highlighted based on the previous user-provided responses to previous learning interactions; and
transmitting the generated electronic copy to a device of the entity other than the user to display the plurality of highlighted items.

9. The method of claim 1, further comprising transmitting a notification to the user in response to the future knowledge of the user and/or the active knowledge of the user related to the particular task performed in the certain profession being predicted to be below the specified threshold.

10. The method of claim 1, further comprising scheduling the second learning interaction in response to the future knowledge of the user and/or the active knowledge of the user related to the particular task performed in the certain profession being predicted to be below the specified threshold.

11. A learning system comprising:
a non-transitory memory storing one or more user parameters associated with a user of the learning system; and
one or more hardware processors coupled to the non-transitory memory and configured to execute instructions to cause the learning system to perform operations comprising:
accessing a first learning interaction provided to a user of the learning system and a user-provided response to the first learning interaction;
retrieving the one or more user parameters from the non-transitory memory;
predicting, based on the one or more user parameters, a predicted response to the first learning interaction;
comparing the predicted response to the user-provided response;
in response to determining that the predicted response does not match the user-provided response, generating one or more updated user parameters;
generating one or more learning assets based on the one or more updated user parameters, the one or more learning assets providing content for a second learning interaction;
generating the second learning interaction based on the one or more learning assets;
predicting, based on the one or more updated user parameters, whether or not each of a future knowledge of the user and an active knowledge of the user related to a particular task performed in a certain profession is below a specified threshold;
storing the one or more updated user parameters in the non-transitory memory;
transmitting the one or more updated user parameters to an entity other than the user to provide feedback associated with the user; and
transmitting the second learning interaction to the user in response to the future knowledge of the user and/or the active knowledge of the user related to the particular task performed in the certain profession being predicted to be below the specified threshold; wherein
the generating of the one or more learning assets includes:
accessing one or more knowledge sources;
generating a text document based on a digital file included in the one or more knowledge sources accessed;
tokenizing the text document;
generating a semantic model based on the tokenized text document using an unsupervised machine learning algorithm;
assigning a plurality of passage scores to a corresponding plurality of passages of the tokenized text document, wherein each of the plurality of passage scores is assigned based on a relationship between a respective one of the plurality of passages and the semantic model; and
selecting a plurality of knowledge items from the tokenized text document based on the plurality of passage scores to extract the plurality of knowledge items from the one or more knowledge sources;
filtering the plurality of knowledge items based on the one or more updated user parameters to form one or more filtered knowledge items; and
building the one or more learning assets based on the one or more filtered knowledge items; and the predicted response is further predicted based on an interaction history associated with the user, the interaction history includes previous user-provided responses to previous learning interactions.

12. The learning system of claim 11, wherein the one or more user parameters includes a motivation parameter that indicates whether the user is intrinsically motivated or extrinsically motivated.

13. The learning system of claim 11, wherein the operations further comprise scheduling the second learning interaction based on the one or more updated user parameters.

14. The learning system of claim 13, wherein scheduling the second learning interaction comprises selecting at least one of a timing of the second learning interaction or a type of the second learning interaction.

15. The learning system of claim 11, wherein the interaction history includes aggregate statistics associated with the previous user-provided responses and other previous interactions between the user and the learning system.

16. The learning system of claim 11, wherein
the digital file included in the one or more knowledge sources accessed includes one or more of text, audio, and multimedia in an unstructured digital format; and
the generating the text document includes:
generating a plurality of intermediate text documents from the digital file using a corresponding plurality of conversion techniques;
selecting the text document from the plurality of intermediate text documents; and
repairing the text document in response to the selecting the text document from the plurality of intermediate text documents.

17. The learning system of claim 11, wherein the operations further comprise:
identifying a plurality of concepts in the tokenized text document;
assigning a concept score to each of the plurality of concepts based on a second relationship between each of the plurality of concepts and the semantic model; wherein
the plurality of passage scores are assigned based on the concept score corresponding to each of the plurality of concepts;
the plurality of concepts include noun phrases determined using natural language processing of the tokenized text document, and the natural language processing includes at least speech tagging or noun chunking; and
the second relationship is defined by a centrality metric that indicates how central a corresponding concept is to one or more topics in the semantic model.

18. The learning system of claim 11, wherein the operations further comprise:
generating an electronic copy of at least a portion of the digital file included in the one or more knowledge sources accessed, the electronic copy including a plurality of highlighted items that are highlighted based on the previous user-provided responses to previous learning interactions; and
transmitting the generated electronic copy to a device of the entity other than the user to display the plurality of highlighted items.

19. The learning system of claim 11, wherein the operations further comprise transmitting a notification to the user in response to the future knowledge of the user and/or the active knowledge of the user related to the particular task performed in the certain profession being predicted to be below the specified threshold.

20. The learning system of claim 11, wherein the operations further comprise scheduling the second learning interaction in response to the future knowledge of the user and/or the active knowledge of the user related to the particular task performed in the certain profession being predicted to be below the specified threshold.

21. A non-transitory machine-readable medium having stored thereon machine-readable instructions executable to cause a learning system to perform operations comprising:
accessing a first learning interaction provided to a user of the learning system, a user-provided response to the first learning interaction, and one or more user parameters associated with the user;
predicting, based on the one or more user parameters, a predicted response to the first learning interaction;
determining whether the predicted response matches the user-provided response;
in response to determining that the predicted response does not match the user-provided response, updating the one or more user parameters; and
generating one or more learning assets based on the one or more updated user parameters, the one or more learning assets providing content for a second learning interaction;
generating the second learning interaction based on the one or more learning assets;
predicting, based on the one or more updated user parameters, whether or not each of a future knowledge of the user and an active knowledge of the user related to a particular task performed in a certain profession is below a specified threshold;
transmitting the one or more updated user parameters to an entity other than the user to provide feedback associated with the user; and
transmitting the second learning interaction to the user in response to the future knowledge of the user and/or the active knowledge of the user related to the particular task performed in the certain profession being predicted to be below the specified threshold; wherein
the generating of the one or more learning assets includes:
accessing one or more knowledge sources;
generating a text document based on a digital file included in the one or more knowledge sources accessed;
tokenizing the text document;
generating a semantic model based on the tokenized text document using an unsupervised machine learning algorithm;
assigning a plurality of passage scores to a corresponding plurality of passages of the tokenized text document, wherein each of the plurality of passage scores is assigned based on a relationship between a respective one of the plurality of passages and the semantic model; and
selecting a plurality of knowledge items from the tokenized text document based on the plurality of passage scores to extract the plurality of knowledge items from the one or more knowledge sources;
filtering the plurality of knowledge items based on the one or more updated user parameters to form one or more filtered knowledge items; and
building the one or more learning assets based on the one or more filtered knowledge items; and
the predicted response is further predicted based on an interaction history associated with the user, the interaction history includes previous user-provided responses to previous learning interactions.

22. The non-transitory machine-readable medium of claim 21, further comprising scheduling the second learning interaction based on the one or more updated user parameters; wherein the scheduling of the second learning interaction comprises selecting at least one of a timing of the second learning interaction or a type of the second learning interaction.

23. The non-transitory machine-readable medium of claim 21, wherein the interaction history includes aggregate statistics associated with the previous user-provided responses and other previous interactions between the user and the learning system.

24. The non-transitory machine-readable medium of claim 21, wherein the digital file included in the one or more knowledge sources accessed includes one or more of text, audio, and multimedia in an unstructured digital format; and the generating the text document includes:

generating a plurality of intermediate text documents from the digital file using a corresponding plurality of conversion techniques;

selecting the text document from the plurality of intermediate text documents; and repairing the text document in response to the selecting the text document from the plurality of intermediate text documents.

25. The non-transitory machine-readable medium of claim 21, wherein the operations further comprise:

identifying a plurality of concepts in the tokenized text document;

assigning a concept score to each of the plurality of concepts based on a second relationship between each of the plurality of concepts and the semantic model; wherein the plurality of passage scores are assigned based on the concept score corresponding to each of the plurality of concepts;

the plurality of concepts include noun phrases determined using natural language processing of the tokenized text document, and the natural language processing includes at least speech tagging or noun chunking; and the second relationship is defined by a centrality metric that indicates how central a corresponding concept is to one or more topics in the semantic model.

26. The non-transitory machine-readable medium of claim 21, wherein the operations further comprise:

generating an electronic copy of at least a portion of the digital file included in the one or more knowledge sources accessed, the electronic copy including a plurality of highlighted items that are highlighted based on the previous user-provided responses to previous learning interactions; and transmitting the generated electronic copy to a device of the entity other than the user to display the plurality of highlighted items.

27. The non-transitory machine-readable medium of claim 21, wherein the operations further comprise transmitting a notification to the user in response to the future knowledge of the user and/or the active knowledge of the user related to the particular task performed in the certain profession being predicted to be below the specified threshold.

28. The non-transitory machine-readable medium of claim 21, wherein the operations further comprise scheduling the second learning interaction in response to the future knowledge of the user and/or the active knowledge of the user related to the particular task performed in the certain profession being predicted to be below the specified threshold.

\* \* \* \* \*